United States Patent Office 3,533,969
Patented Oct. 13, 1970

3,533,969
HALOALKYLATION REACTION EMPLOYING TiCl$_4$
Richard G. Bufton, San Jose, Calif., assignor to Diamond Shamrock Corporation, a corporation of Delaware
No Drawing. Filed July 20, 1966, Ser. No. 566,494
Int. Cl. C08f 27/02, 27/08
U.S. Cl. 260—2.1                                    9 Claims

ABSTRACT OF THE DISCLOSURE

By using TiCl$_4$ or TiBr$_4$ as a catalyst it is possible to haloalkylate a vinyl aromatic resin and thereby obtain a haloalkylated resin matrix which, when reacted to substitute ion-exchange groups for the halogen atoms results in an ion-exchange resin having excellent physical and chemical properties.

---

This invention relates to a process for haloalkylating infusible crosslinked homopolymers and copolymers. More particularly, it relates to the use of such haloalkylated crosslinked polymeric products in the preparation of ion exchange resins.

Ion-exchange resins are well known in the art. They are commonly prepared by attaching functional ion-exchange groups to crosslinked resin matrices. The term "resin matrix" or "resin matrices" as employed herein designates, the hard, infusible carrier resin or resins that are insoluble in polar and non-polar solvents, to which functional ion-exchange groups are attached.

The ion-exchange resin matrices may either be cross-linked or uncrosslinked linear aromatic polymers. The crosslinked matrices are well known and widely used and are prepared by copolymerizing a major proportion of a monovinyl aromatic compound, e.g., styrene, with a minor proportion of a polyvinyl aromatic compound as the crosslinking agent, e.g., divinyl benzene. In practice, the preparation of such crosslinked aromatic resins is accomplished by a variety of methods well known in the art. Exemplary of a resin matrix which is linear and uncrosslinked is polystyrene per se. The resin matrix, either in granular or bead form, may then be converted to an ion exchange resin by first subjecting the resin matrix to haloalkylation whereby a plurality of active haloalkyl, e.g., bromoalkyl or chloroalkyl, groups are introduced into the aromatic nuclei. In the case of an uncrosslinked linear resin matrix the treatment with the haloalkylating agent results in both haloalkylation and crosslinking of the resin matrix. In such instances alkylene, e.g., methylene, bridging links the molecules of polymer together.

The haloalkylated resin matrix may then be reacted with either a tertiary amine, e.g., trimethylamine or dimethylethanolamine to prepare a strong base anion-exchange resin; dimethyl sulfide to produce a sulfonium derivative which is also a strong base anion exchange resin; a trialkyl phosphite, e.g., triethyl phosphite, the reaction product of which is subjected to hydrolysis to prepare a phosphonic acid cation exchange resin; or an alkali cyanide, e.g., sodium cyanide, to prepare a nitrile which is hydrolyzed to produce a carboxylic acid cation exchange resin. The use of a haloalkylated resin matrix permits the manufacture of many other useful ion exchange resins.

As can be readily observed, the effectiveness of any ion exchange resin prepared from the intermediate haloalkylated resin matrix is determined by the number of available sites for attaching the functional ion-exchange groups. That is, the more functional ion-exchange groups present in the resin, the more effective will be the resultant ion exchange characteristics, e.g., capacity of the resins. Thus, the effectiveness of the haloalkylation of the resin matrix ultimately determines the number of available functional ion-exchange groups attached to the base resin matrix.

It is an object of the present invention to provide a new and improved method for the haloalkylation of a base resin matrix.

It is a further object to decrease the alkylene bridging reaction during haloalkylation.

It is a still further object of the present invention to provide improved ion exchange resins.

These and other objects of the present invention are obtained by increasing the number of haloalkyl groups on a base resin matrix by haloalkylating the resin matrix with a haloalkylating agent and as the haloalkylation catalyst a titanium halide selected from titanium tetrachloride and titanium tetrabromide, preferably titanium tetrachloride.

In general, the present invention comprises haloalkylating a resin matrix in the presence of a catalytically effective amount of titanium tetrachloride or titanium tetrabromide. Generally, the haloalkylation reaction is carried out at a temperature generally within the range from −25° C. up to the reflux temperature of the haloalkylating agent, preferably within the range from about −10° C. to 60° C., at either atmospheric or superatmospheric pressures.

As used herein in the specification and claims, the term "haloalkylation" refers to the method for introducing into the base resin matrix a plurality of haloalkyl groups which have the general formula —C$_n$H$_{2n}$X, in which X is either a chlorine or bromine atom and —C$_n$H$_{2n}$ is an alkylene group, either straight chain or branched, wherein n is an integer from 1 to 4. Those compounds which introduce chloromethyl groups, —CH$_2$Cl, into the resin matrix are preferred, with methyl chloromethyl ether being the especially preferred chloromethylating agent. Examples of other chloromethylating and bromomethylating agents may be found in "Organic Reactions," vol. I, John Wiley & Sons, Inc., 1942.

As previously described, the resin matrix may be either the copolymer of a monovinyl aromatic compound, such as styrene, with a minor proportion of a polyvinyl aromatic compound as the crosslinking agent or a linear uncrosslinked aromatic polymer such as polystyrene. Exemplary of other monovinyl aromatic compounds which may be employed include vinyl toluene, alpha-methyl styrene, vinyl xylene, vinyl naphthalene, ethyl vinylbenzene, monochlorostyrene, and vinyl anthracene. In addition to divinylbenzene, other crosslinking agents include the divinyl toluenes, the divinyl naphthalenes, the divinyl ethylbenzenes and the divinyl xylenes. While it is preferred, it is not necessary that the crosslinking agent contain an aromatic nucleus, it is only necessary that one component of the copolymer contain aromatic nuclei so that there will be nuclei available for crosslinking and attachment of active side chains. Such aliphatic crosslinking agents includes ethylene dimethacrylate, divinyl sulfone and acrylonitrile.

Another type of resin matrix which may be employed is a copolymer of a linear vinyl aromatic polymer, e.g., polystyrene, which has been crosslinked by reacting it with a halosulfonic acid-aldehyde complex, e.g., a chlorosulfonic acid-formaldehyde complex, as set forth in the disclosure of U.S. Pat. No. 2,900,352, which is hereby incorporated by reference.

By subjecting such resin matrices to haloalkylation by the process of the present invention, products are obtained which, when converted to ion-exchange resins, exhibit a high exchange capacity and improved regeneration efficiency.

A typical resin matrix may be prepared by copolymerizing a major amount, e.g., from 60 to 99.9, preferably 80 to 99.5, percent by weight of the monomer mixture, of a monovinyl aromatic monomer with a minor amount, e.g., from 0.1 to 40, preferably 0.5 to 20, percent by weight of the monomer mixture, of a polyvinyl aromatic monomer. The polymerization is conducted in the presence of well known initiators which include organic peroxides, e.g., benzoyl peroxide and lauroyl peroxides and the azo compounds, e.g., azobis - isobutyronitrile. The initiator generally is employed in amounts ranging from about 0.1% to about 2% by weight of the monomeric mixture. Suspending agents may also be employed, e.g., gelatin, starch, clays, tricalcium phosphate, carboxymethyl cellulose and methylcellulose. The polymerization temperature is generally within the range from about 50° C. up to about 120° C. and the reaction is continued until the liquid monomer is converted into a solid infusible polymer, generally from about 3 to 8 hours.

The next step in the preparation of ion-exchange resins is the haloalkylation of the resin matrix to introduce available sites for the attachment of ion-exchange groups in the final product. As mentioned previously the greater the number of available haloalkyl sites in the resin matrix the greater will be the capacity of the final resin product to efficiently exchange ions. The upper limit of haloalkylation is that achieved when every available position in the aromatic nuclei is halo alkylated.

In previous methods for the haloalkylation of a resin matrix employing either aluminum chloride, zinc chloride or stannic chloride, it has been found that the haloalkylating agent causes crosslinking of the polymer with the formation of alkylene, e.g., methylene, bridging within the polymer structure resulting in a lower yield of haloalkyl groups resulting in dense non-porous ion exchange materials. With these catalysts the haloalkyl groups introduced into the polymer were found to react to an appreciable degree with adjacent aromatic rings in the resin matrix structure resulting in the loss of two haloalkyl groups for subsequent reaction with the functional ion exchange group. However, it has now been found that by employing titanium tetrachloride or titanium tetrabromide as the haloalkylation catalyst, little, if any, of the haloalkyl groups introduced into the polymer react with the adjacent aromatic ring thereby making available more sites for subsequent reaction with ion-exchange functional groups. For instance, the above may be represented as follows:

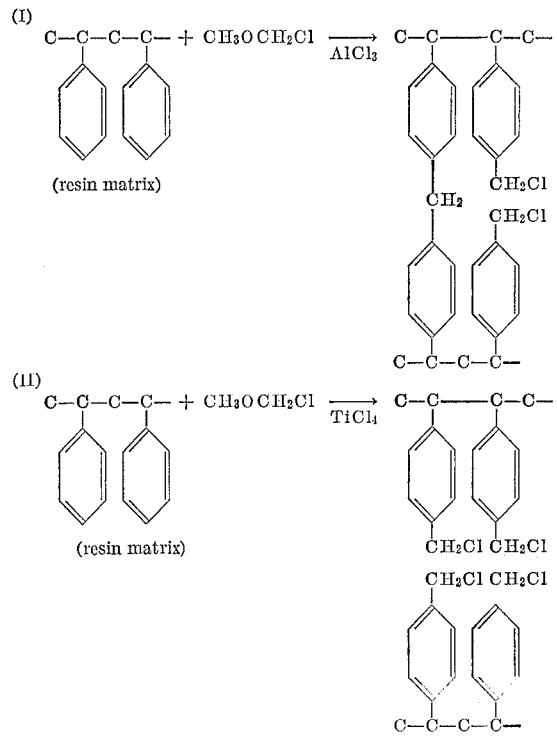

As can be readily seen in reaction (1), methylene bridging occurs between two aromatic nuclei with the resulting loss of two potential sites for subsequent introduction of ion exchange functional groups; whereas in reaction (II), the absence of such methylene bridging results in the availability of two more sites for introducing ion exchange groups into the resin matrix. The haloalkylated resins of the present invention have been found to contain in excess of 50 haloalkyl radicals per 100 aromatic nuclei in the polymer.

The haloalkylation reaction is carried out by first soaking the resin matrix with the haloalkylation agent, for example, methyl chloromethyl ether, until the resin matrix achieves a substantial degree of swelling which is accomplished generally in an hour. This soaking and swelling of the polymer particles facilitates the halomethylation reaction within the matrix pores of the particles. The haloalkylation temperature is generally close to or at the reflux temperature of the haloalkylating agent, for instance, methyl chloromethyl ether (60° C.), to insure a significant degree of polymer swelling and absorption of the haloalkylating agent. The catalyst, in amounts ranging from about 0.1 to 5.0, preferably 0.1 to 1.0, mols per mol of resin matrix is then slowly added to the swollen polymer-haloalkylating agent mixture with agitation. After addition, agitation of the reaction mixture is continued for at least 4 hours, preferably for at least 16 hours, to insure adequate haloalkylation of the resin matrix. Prior to catalyst addition, the reaction mixture should be cooled to a temperature of 30° C. or lower and should be maintained at a maximum temperature of 30° C. while adding the catalyst. After catalyst addition is completed, the reaction mixture may be heated to at least 40° C. and may be maintained at such a temperature during the remainder of the reaction.

Following haloalkylation of the resin matrix, ion exchange groups, such as quaternary ammonium groups, are introduced into the haloalkylated resin matrix by the known methods in the art.

In order that those skilled in the art may more completely understand the present invention and the preferred methods by which the same may be carried into effect, the following specific examples are offered.

EXAMPLE 1

This procedure is applied only to the linear or uncrosslinked polystyrene. 0.27 mol of methyl chloromethyl ether is placed in a three-necked flask equipped with a stirrer, a reflux condenser, and an addition funnel. 0.40 mol of titanium tetrachloride is then added, with stirring. To this mixture is added 400 ml. of a low boiling (35°–60° C.) ligroin and the flask is cooled to 0° C. One mol of linear polystyrene beads is then added slowly to the mixture. At the end of the addition, the reaction is heated to 35° C. for 16 hours. The beads are separated from the reaction mixture, washed thoroughly with water and methanol.

In a similar manner, linear polystyrene is chloromethylated employing as the chloromethylation catalyst alunium chloride, zinc chloride and stannic chloride.

The effectiveness of a given chloromethylation is determined by the swelling measurements. Each of the chloromethylated intermediates is immersed in methylene chloride for 16 hours at room temperature and the resin volume is compared to the volume of the same weight of chloromethylated polymer in water. If methylene bridging occurs along with chloromethylation, then the resultant product will be more highly crosslinked than the original polymer. It will, therefore, swell less in a swelling solvent which is one means of estimating the relative amount of crosslinking which occurs during chloromethylation and attributed to the particular catalyst employed. The greater the swelling, the lower the crosslinking. The results are summarized in Table I.

TABLE I

| Catalyst: | Percent swelling (at equilibrium) |
|---|---|
| Aluminum chloride | 91 |
| Zinc chloride | 61 |
| Stannic chloride | 70 |
| Titanium chloride | 126 |

EXAMPLE 2

In accordance with the general procedure as outlined in U.S. Pat. No. 2,900,352, a complex for crosslinking linear polystyrene is prepared as follows.

1368 ml. of methanol and 1012 g. of 91%, by weight, para-formaldehyde are placed into a 5000-ml. three-necked flask fitted with a thermometer, a stainless steel agitator and an addition funnel. Accompanied by rapid agitation, 2030 ml. of chlorosulfonic acid is added dropwise to this mixture over a period of 8 hours. The temperature of the reaction mixture is maintained at approximately 30° C. by immersing the reaction kettle in a cold water bath. Shortly after all of the chlorosulfonic acid has been added, agitation is discontinued and the reaction mixture is allowed to separate into two phases. The upper phase is a clear, light colored liquid comprising about one part by volume of the total mixture, while the lower phase is a more viscous yellow liquid comprising about 7 parts by volume of the total complex mixture. The upper phase is separated from the lower phase by decanting.

To 157.5 ml. of the lower phase of the prepared complex containing 270 p.p.m. Fe as $FeCl_3$ is slowly added with agitation 0.3 mol (31.2 g.) of linear polystyrene beads. The resulting polystyrene-complex mixture is allowed to react for 5 minutes at room temperature and then heated to 40° C. 52.5 ml. of the upper phase of the complex is then added with agitation, and the reaction is continued for an additional hour at 40° C. The reaction mixture is then cooled and the polymer beads are washed free of reactants successively with excess methanol and acetone and are finally air dried.

Into a three-necked flask equipped with a stirrer, a reflux condenser and a glass addition funnel is placed 0.25 mol of the complex-crosslinked polystyrene. With agitation, 190 ml. of methyl chloromethyl ether is added to the flask and the reaction mixture is heated at reflux (60° C.) for one hour. At the end of this time, the reaction mixture is cooled to 30° C. and 25.4 ml. of titanium tetrachloride is added slowly over a one hour time period, while maintaining the temperature of the reaction mixture at 30° C. by means of an ice-water bath. After this addition, the reaction mixture is heated and stirred for 16 hours at 40° C. The resin in the mixture is then freed of reactants by washing with cold water, after which it is air-dried.

In similar manner, aluminum chloride and zinc chloride catalysts are employed in preparing the chloromethylated complex-crosslinked polystyrene. The chloromethylated complex-crosslinked polystyrene resin matrices are each immersed in methylene chloride for 16 hours at room temperature and the resin volume is compared to the volume of the same weight of chloromethylated polymer in water as in Example 1. These data are presented in Table II below.

TABLE II

| Catalyst: | Percent swelling (at equilibrium) |
|---|---|
| Aluminum chloride | 85 |
| Zinc chloride | 70 |
| Titanium chloride | 105 |

EXAMPLE 3

Into a 500-ml. flask equipped with a stirrer and variable speed motor is introduced 200 ml. of water containing 1% dissolved polyvinyl alcohol. This medium is heated to 88° C., then a mixture of 83 g. of styrene, 7.03 g. of 56.7% divinylbenzene and 0.3 g. of benzoyl peroxide are added to the aqueous phase. The stirring speed is adjusted for optimum particle size of 20 to 50 mesh and the polymerization is allowed to continue for 3 hours at 88° C., after which the bath temperature is raised to 93° C. and the polymerization continued for an additional 16 hours. The beads are separated by filtration, screened and dried.

Into a three-necked flask equipped with a stirrer, reflux condenser and glass addition funnel is added 0.25 mol of the above styrene-divinyl benzene copolymer to which is added 95 ml. of methyl chloromethyl ether. This mass is heated at reflux (60° C.) for 1 hour, and then the reaction is cooled to 30° C. 12.7 ml. of titanium tetrachloride is then slowly added over a period of 1 hour while holding the temperature at 30° C. Following this addition, the chloromethylated resin is then freed of reactants, washed with cold water, filtered and air-dried overnight. The chloromethylated resin has 86 chloromethyl groups per 100 aromatic nuclei.

In a similar manner, aluminum chloride and zinc chloride catalysts are employed. Each of the chloromethylated styrene-divinyl benzene intermediates is then immersed in methylene chloride for 16 hours at room temperature and the resin volume for each is compared to the volume of the same weight of chloromethylated polymer in water. These results are summarized in Table III below.

TABLE III

| Catalyst: | Percent swelling (at equilibrium) |
|---|---|
| Aluminum chloride | 71 |
| Zinc chloride | 60 |
| Titanium chloride | 115 |

EXAMPLE 4

One-tenth mol samples of each of the chloromethylated linear polystyrene prepared in Example 1 using the various chloromethylation catalysts are treated as follows: Each is placed in a reaction flask with 18.6 ml. of methylene chloride and allowed to swell for 15 minutes. To each of the chloromethylated linear polystyrene-methylene chloride mixture is added 79 ml. of a 25% aqueous solution of trimethylamine. The reaction flask is then closed and the reaction mixture is heated to 35° C. and maintained at this temperature for 3 hours. The reaction flask is then opened and the reaction mixture is heated at 42–43° C. for an additional hour. The reaction mixture is then cooled, the excess liquid drained off and the resin beads washed with water, then dilute hydrochloric acid, then with water again. The values found in Table IV for "Exhausted Volume Chloride Form" indicate the yield of resin per unit quantity of the initial polystyrene polymer which is the same for all the resins described in Table IV. A large volume indicates the negligible amount of methylene bridging as well as a large amount of the chloromethylated intermediate available for reaction with trimethylamine.

Each of the ion exchange resins prepared by the different haloalkylation catalysts is tested for its strong-base capacity as follows: 30 ml. of the resin is placed in a 1-inch diameter capacity tube. 100 ml. of 1–2 N sodium hydroxide solution, heated to 50° to 60° C., is passed downwardly through the resin at a rate of about 30 cc. of solution per minute. The resin is then rinsed by passing deionized water therethrough at the same rate to achieve a pH of 7. A three-percent sodium chloride solution is then passed through the resin at the same rate of 30 cc. per minute and the effluent is collected in a beaker. With methyl red as indicator, the effluent is titrated with 1 N hydrochloric acid to the red end-point. The strong base capacity is expressed in equivalents per liter and refers to the total capacity found in 1 liter of the resin. A high number here reflects a large amount of crosslinking or methylene bridging produced during the chloromethylation step since the polystyrene used was not crosslinked prior to the chloromethylation step.

The moisture content of each of the resins is inversely related to the degree of crosslinking and directly related to the effective chloromethylation and subsequent introduction of quaternary ammonium groups.

The capacity in milliequivalents per gram, which also indicates the efficiency of haloalkylation and subsequent amination is also determined. The higher the value, the higher the efficiency of the chloromethylation reaction.

These data are presented in Table IV below:

TABLE IV

| Catalyst | Exhausted volume chloride form | Strong base capacity, equivalents per liter | Percent moisture in product | Capacity, milliequivalents per gram |
|---|---|---|---|---|
| Aluminum chloride | 35.0 | 0.92 | 62.8 | 3.94 |
| Zinc chloride | 32.0 | 1.20 | 54.2 | 4.30 |
| Stannic chloride | 45.0 | 0.98 | 60.1 | 4.12 |
| Titanium chloride | 54.5 | 0.83 | 68.5 | 4.70 |

It will be observed from the above data that the ion exchange resins prepared from the chloromethylated linear polystyrene employing titanium tetrachloride as the haloalkylation catalyst exhibit consistently favorable properties as a result of more effective chloromethylation step employing titanium tetrachloride as the chloromethylation catalyst.

EXAMPLE 5

One-tenth mol of each of the chloromethylated complex-crosslinked polystyrene beads prepared in Example 2 is placed in separate reaction flasks and treated as follows: 18.6 ml. of methylene chloride is added and the beads are allowed to swell for 15 minutes. To this mixture is added 79 ml. of a 25% aqueous solution of trimethylamine. The reaction flask is closed and the reaction mixture heated to 40° C. and maintained at this temperature for 3 hours. At the end of this time the reaction flask is then opened and the reaction mixture heated at 42–43° C. for one additional hour. The mixture is then cooled and the excess liquid drained off and the resin beads are washed first with dilute hydrochloric acid, then with water. The ion-exchange and moisture-holding capacities of each product are determined. These data are presented in Table V below.

TABLE V

Catalyst—Titanium chloride
Strong base capacity (equivalents per liter)—1.36
Percent moisture in product—52

The aminated products of the chloromethylated complex-crosslinked polystyrene beads employing aluminum chloride and zinc chloride as the chloromethylated catalysts have strong base capacities which are too low for commercially acceptable ion exchange resins, whereas the resins prepared employing titanium tetrachloride as the chloromethylation catalyst are commercially usable.

EXAMPLE 6

One-tenth mol of each of the chloromethylated styrene divinyl benzene copolymers prepared in Example 3 is placed in separate reaction flasks and is treated as follows: 18.6 ml. of methylene chloride is added and the resin is allowed to swell for 15 minutes. To this mixture is added 79 mol of 25-percent solution of trimethylamine. The reaction flask is closed and the reaction mixture is then heated to 40° C. and maintained at this temperature for 3 hours. The reaction flask is then opened and the reaction mixture is heated to 42° to 43° C. for an additional hour. The mixture is then cooled and the excess liquid drained off. The resin beads are washed well with dilute hydrochloric acid and air dried.

The data presented in Table VI demonstrate that the ion exchange resins prepared with titanium tetrachloride as the chloromethylation catalyst result in products having a greater number of quaternary groups than the resins made with either aluminum chloride or zinc chloride as chloromethylation catalysts.

TABLE VI

| Catalyst | Capacity milliequivalents per gram | Milliequivalents of capacity per 0.1 mol of resin |
|---|---|---|
| Aluminum chloride | 3.59 | 72 |
| Zinc chloride | 3.76 | 72 |
| Titanium chloride | 4.16 | 86 |

EXAMPLE 7

Example 3 is repeated except that the styrene-divinylbenzene copolymer is chloromethylated employing 42.5 grams of titanium tetrabromide as the chloromethylating catalyst. The resulting chloromethylated styrene-divinyl benzene copolymer is then aminated according to the procedure of Example 6 and its strong-base capacity is determined. These data are presented in Table VII, below.

TABLE VII

Catalyst—Titanium tetrabromide
Capacity milliequivalents per gram—4.18
Milliequivalents of capacity per 0.1 mol of resin—79

EXAMPLE 8

0.05 mol of the chloromethylated copolymer of styrene and divinylbenzene (prepared by the method of Example 3) is thoroughly washed with methanol and acetone and then reacted with 0.1 mol of triethyl phosphite in the presence of 15 ml. of Standard Thinner 350 in a petroleum distillage (boiling range of 160° to 200° C. and manufactured by Standard Oil Company) at 150° C. for 10 hours. The unused reactant is washed out and the phosphonium intermediate hydrolyzed with 150 ml. of concentrated hydrochloric acid. A phosphonic cation exchange resin is recovered. The total weak-acid capacity of the resin is 4.25 equivalents per liter and a bed capacity of 900 milliequivalents.

EXAMPLE 9

One mol of the chloromethylated complex-crosslinked polystyrene prepared in Example 2 is swollen with 1 liter of dimethyl formamide for 15 minutes, after which 1 liter of dimethyl sulfoxide is added. Then 5 mols of sodium cyanide is added and the reaction stirred and heated at 35° C. for 16 hours. The beads are then washed free of reactants and hydrolyzed with 480 grams of potassium hydroxide and 480 ml. of water and 2880 ml. of diethylene glycol at 120° C. for 16 hours. A carboxylic cation exchange resin is recovered. The total weak-acid capacity of the resin is 2.21 equivalents per liter of resin and a bed capacity of 820 milliequivalents.

EXAMPLE 10

One mol of the chloromethylated styrene-divinyl benzene copolymer prepared by the method of Example 3 is swollen with 186 ml. of methylene chloride for 15 minutes, after which 6 mols of dimethyl sulfide is added and the reaction proceeds for 3 hours at 35° C. in a closed reaction flask. The reaction flask is then opened and the reaction allowed to continue for an additional hour at 42° C. The reaction product, a sulfonium chloride, is washed free of reactants. The resin has an anion capacity of 0.90 equivalent per liter and a bed capacity of 320 milliequivalents.

As can be seen from the above data the haloalkylation process of the present invention employing either titanium tetrachloride or titanium tetrabromide as the haloalkylation catalyst, there results a high number of haloalkyl groups in the resin matrix with minimum methylene bridging of the aromatic nuclei thereby making available more sites for introducing ion exchange functional groups in the resin matrix.

What is claimed is:

1. A method of preparing an ion-exchange resin which method comprises:
   (a) reacting for at least 4 hours, in the liquid phase, a vinyl aromatic resin matrix with a haloalkylating agent with the sole haloalkylation catalyst present being selected from the group consisting of titanium tetrachloride and titanium tetrabromide, said catalyst being present in an amount in the range of about 0.1 to 5.0 mols per mol of resin matrix, and,
   (b) further reacting the resultant haloalkylated resin matrix with a compound capable of substituting a functional group for each halogen atom of said resin, said functional group being selected from the group consisting of anionic and cationic exchange groups.

2. The method of claim 1 wherein the vinyl aromatic resin is linear polystyrene.

3. The method of claim 1 wherein the vinyl aromatic resin is a monovinyl aromatic polymer which has been crosslinked by the reaction of said polymer with a complex mixture of a formaldehyde source, an oxygen-containing polar liquid and halosulfonic acid.

4. The method of claim 1 wherein the vinyl aromatic resin is a copolymer containing, by weight, from 60 percent to 99.9 percent of an aromatic monovinyl hydrocarbon crosslinked with about 0.1 to 40 percent of an aromatic polyvinyl aromatic hydrocarbon.

5. The method of claim 1 wherein the haloalkylating agent is a haloalkyl ether containing 1 to 4 carbon atoms in the alkyl radical.

6. The method of claim 5 wherein the haloalkyl ether is methyl chloromethyl ether.

7. The method of claim 1 wherein the haloalkylation reaction is conducted at a temperature ranging from $-25°$ to $60°$ C.

8. The method of claim 1 wherein the functional ion exchange group is anionic and is selected from the members consisting of quaternary ammonium and sulfonium.

9. The method of claim 1 wherein the functional ion exchange group is cationic and is selected from the members consisting of carboxylic acid and phosphonic acid.

References Cited

Chem. Abstr. 57, 12734f.

WILLIAM H. SHORT, Primary Examiner

M. GOLDSTEIN, Assistant Examiner

U.S. Cl. X.R.

260—2.2, 88.2, 93.5